May 19, 1970 D. HOLLINGWORTH 3,512,610
LUBRICATION SYSTEM FOR COUPLED ENGINES
Filed Dec. 2, 1968 2 Sheets-Sheet 1

FIG. I

INVENTOR
Derek HOLLINGWORTH

ATTORNEY

INVENTOR
Derek HOLLINGWORTH
ATTORNEY

United States Patent Office 3,512,610
Patented May 19, 1970

3,512,610
LUBRICATION SYSTEM FOR COUPLED ENGINES
Derek Hollingworth, Ville Brossard, Quebec, Canada, assignor to United Aircraft of Canada Limited, Longueuil, Quebec, Canada
Filed Dec. 2, 1968, Ser. No. 780,490
Int. Cl. F01m 1/12; F16n 7/14; F01b 21/00
U.S. Cl. 184—6                                11 Claims

ABSTRACT OF THE DISCLOSURE

Two lubrication systems for an engine system having two engines coupled together by a reduction gearbox to a single output shaft. Each lubrication system lubricates one engine and the input portion of the gearbox and is selectively connected to lubricate the output portion of the gearbox. A control unit in each system selectively connects it to the output portion of the gearbox.

BACKGROUND OF THE INVENTION

Field of the invention

This invention relates to lubricating an engine system. More particularly, the invention relates to lubricating an engine system of the type in which two engines are coupled together by a reduction gearbox to a single output shaft, the reduction gearbox divided into two input gear compartments, one for each engine, and one output gear compartment for the output shaft.

Description of prior art

Lubrication for an engine system having two engines coupled together by a reduction gearbox has previously been provided by three separate lubrication systems, one for each engine and one for the reduction gearbox. The use of three lubrication systems has the disadvantage that three separate sets of pumps, oil coolers, pressure regulating valves, filters, etc., are required for each system thereby increasing the cost and weight of the lubrication means. Further, failure of the lubrication system for the reduction gearbox results in failure of the entire engine system.

SUMMARY OF THE INVENTION

The present invention presents an improvement over the prior art. Briefly, the invention comprises lubrication means for an engine system of the type wherein two engines are coupled together by a reduction gearbox to a single output. The reduction gearbox has one output gear compartment and two input gear compartments, one for each engine. The lubrication means comprises two separate lubrication systems. Each system is connected to lubricate one engine and the input gear compartment in the reduction gearbox for that engine. Each system is also selectively connected, through a control unit, to lubricate the output gear compartment. The control unit connects the first of the two systems to attain operating pressure to the output gear compartment and prevents connection of the other system as long as the first system maintains the predetermined pressure. Normally, the first system connected is the system of the first engine started.

The invention further relates to a control unit which can selectively connect one of two separate lubrication systems to a single device to be lubricated, such as the output gear compartment in a reduction gearbox. The control unit connects the first lubrication system to attain an operating pressure to the device and prevents the second lubrication system, even though it later also attains the operating pressure, from being connected to the device provided the first lubrication system maintains said operating pressure. If the pressure of the first lubrication system falls below a predetermined pressure less than the operating pressure, the control unit disconnects the first system from the device and connects the second system to it.

The control unit includes two identical control valves, one for each lubrication system. Each control valve includes a scavenger valve movable to an open position to open a return fluid flow path from the device to the associated lubrication system, and a pressure valve, movable to an open position by the scavenger valve when it moves to the open position, to open a fluid flow path from the associated lubricatin system through the control valve to the device.

Means are provided in each control valve to move the scavenger valve and the pressure valve between open and closed positions. These means are unterconnected by fluid passageways between the control valves so that when one of the control valves is opened when its associated lubrication system attains operating pressure, the fluid is directed to act on the means in the other control valve to close both its pressure and scavenger valves.

Using only two lubrication systems instead of three as was previously done provides a less expensive and lighter lubrication means for coupled engines having a single output. Further, being able to connect either of the two lubrication systems to the output portion of the reduction gearbox provides a safety factor in the event of failure of one of the lubrication systems. Lubrication of the output section of the reduction gearbox is still maintained by the other system, and complete failure of the entire engine system is thereby prevented. By providing a control unit which can connect either lubricating system to the output section of the reduction gear compartment, an additional safety factor is provided if the output section is damaged to cause oil leakage. The amount of oil supplied to the output section can be increased to replace the oil loss thus prolonging the life of the output section before failure occurs. The output section will use oil from one of the two lubrication systems, and when the pressure of the system in use drops due to oil loss, the second lubrication system will be switched in by the control unit to continue to supply oil to the output section thereby prolonging the life of the entire engine system before complete failure occurs.

The invention is particularly suitable for use with coupled gas turbine engines in aircraft where the weight of components should be as small as possible and particularly in military aircraft where the possibility cf failure of lubricating systems due to enermy fire is greatly increased.

BRIEF DESCRIPTION OF THE DRAWINGS

The preferred embodiment of the invention will now be described in detail having reference to the accompanying drawings, in which.

DESCRIPTION OF THE PREFERRED EMBODIMENTS

Figure 1:
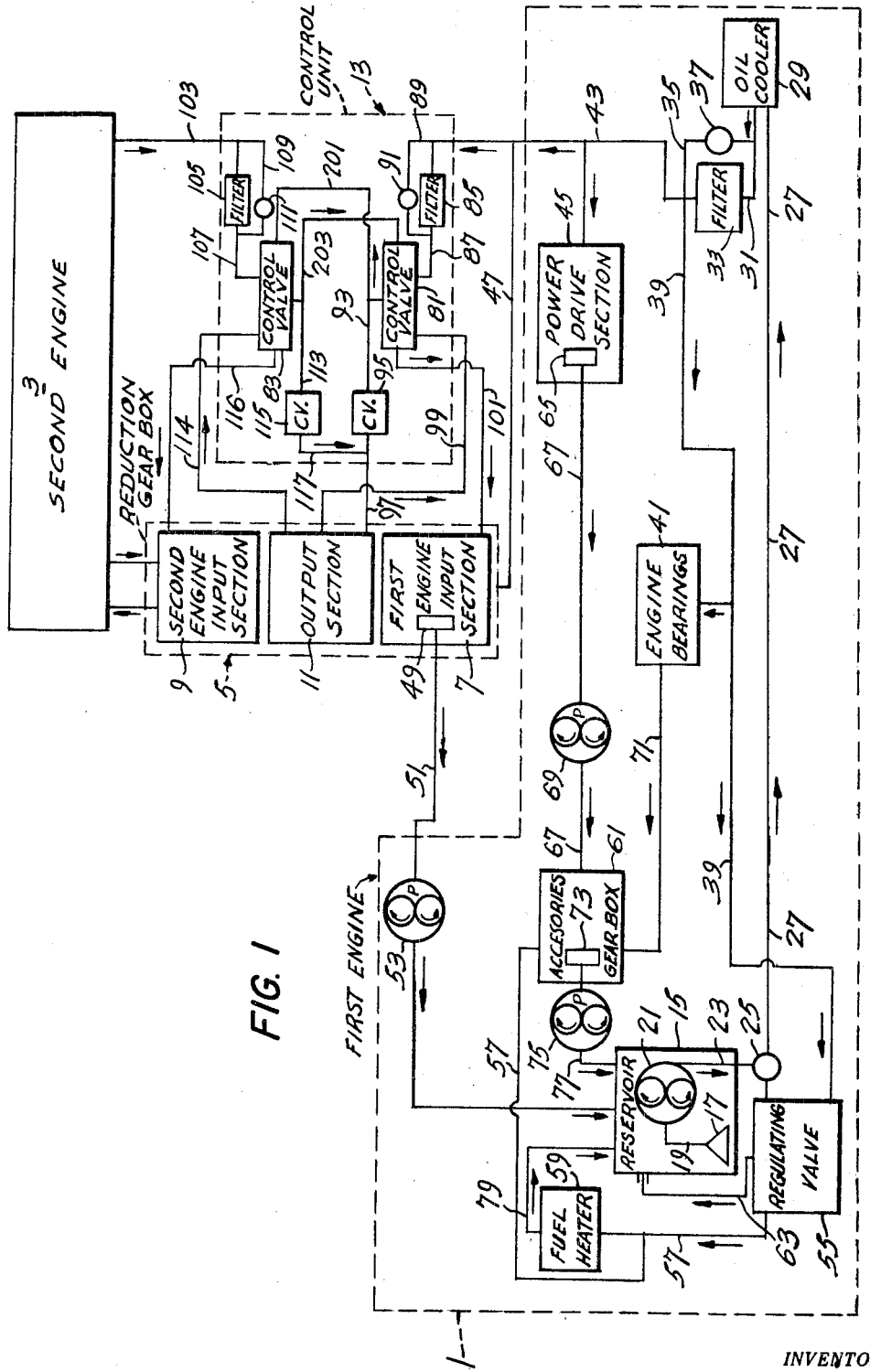
FIG. 1 is a diagrammatic view of the lubrication means.

As shown in FIG. 1, the lubrication means lubricates a first engine 1 and a second engine 3 coupled together through a reduction gearbox 5. The engines and gearbox are shown schematically. The first engine 1 has associated therewith an input section 7 in the reduction gearbox 5 through which the engine power is transmitted. The second engine 3 also has associated therewith an input section 9 in the reduction gearbox 5. Both the input sections 7 and 9 are coupled to an output section 11 in the reduction gearbox for providing a single output from both engines.

Each engine and its associated input section in the reduction gearbox has its own lubrication system. The output section 11 in the reduction gearbox is lubricated by either of the two engine lubrication systems under control of control unit 13 in a manner to be described. Since the lubrication systems of both engines and their connection to the control unit 13 and the associated parts of the reduction gearbox 5 are the same, only one lubrication system has been shown in detail in the drawing. The second lubrication system is identical to the first.

The first lubrication system includes an oil reservoir 15. The oil is drawn from the reservoir through a screen 17 and conduct 19, by a gear pump 21, and passes, by way of conduit 23, to check valve 25. From the check valve, the oil is pumped through conduit 27 to an oil cooler 29. From the oil cooler, the oil passes through a conduit 31 to a filter 33 and then to various portions of the engine 1 and reduction gearbox 5 to provide lubrication thereto. If the filter 33 becomes plugged, the oil can bypass the filter through a bypass conduit 35 and check valve 37.

From the filter 33, the oil flows through conduits 39 to the bearings 41 of engine 1. The oil also passes from filter 33 via conduit 43 to the power drive section 45 of the engine containing other bearings, via conduit 47 to the input section 7 in the reduction gearbox 5 associated with engine 1, and to the control unit 13. From the input section 7 the oil is returned to the oil reservoir 15 through a filter 49, conduit 51, and a gear pump 53.

The oil from conduit 39 also flows to a pressure regulating valve 55, through conduit 57 to both the fuel heater 59 and to the accessories gearbox 61 of the first engine. The pressure regulating valve 55 senses pressure in conduit 39 and bleeds oil from conduit 27, returning oil to the reservoir via conduit 63, thus controlling pressure in the lubrication stem and reducing flow through the coolers and filters to what the system demands rather than full pump capacity.

Oil from the bearings in the power section 45 of the engine is returned through a filter 65, conduit 67, and gear pump 69 to the accessories gearbox 61. Oil from the engine bearings 41 is returned to the accessories gearbox through conduit 71. From the accessories gearbox 61, the oil is pumped through a filter 73 by a gear pump 75 and returned to the oil reservoir 15 through conduit 77. The oil from the fuel heater 59 is returned through conduit 79 to the oil reservoir.

The second lubrication system lubricating the second engine 3 and second input section 9 of the reduction gearbox is identical to the above described first system.

The output section 11 of the reduction gearbox 5 is lubricated by either lubrication system under control of control unit 13. The control unit controls the oil flow from either lubricating system to the output section 11 of the reduction gearbox and from the output section to the respective input section.

The control unit includes two identical control valves 81, 83. Control valve 81 is connected to conduit 43 from the first lubrication system through filter 85 and conduit 87. If filter 85 becomes clogged, oil flows through bypass conduit 89 and check valve 91. The oil passes through control valve 81, conduit 93, check valve 95 and conduit 97 to the output section 11 as shown in FIG. 1. The oil returns from output section 11 through conduit 99, control valve 81 and conduit 101 to input section 7 from where it returns to the reservoir. Control valve 83 is connected to the second lubricating system 3 through conduit 103, filter 105 and conduit 107. A bypass conduit 109 and check valve 111 is provided in case filter 105 becomes clogged. From control valve 83, oil flows through conduit 113, check valve 115, and conduit 117 to conduit 97 and then to output section 11 as shown in FIG. 1. Oil returns from the output section through conduit 114, control valve 83 and conduit 116 to input section 9 of the reduction gearbox. Check valves 95 and 115 prevent oil flow from either lubricating system to each other.

Figure 2:
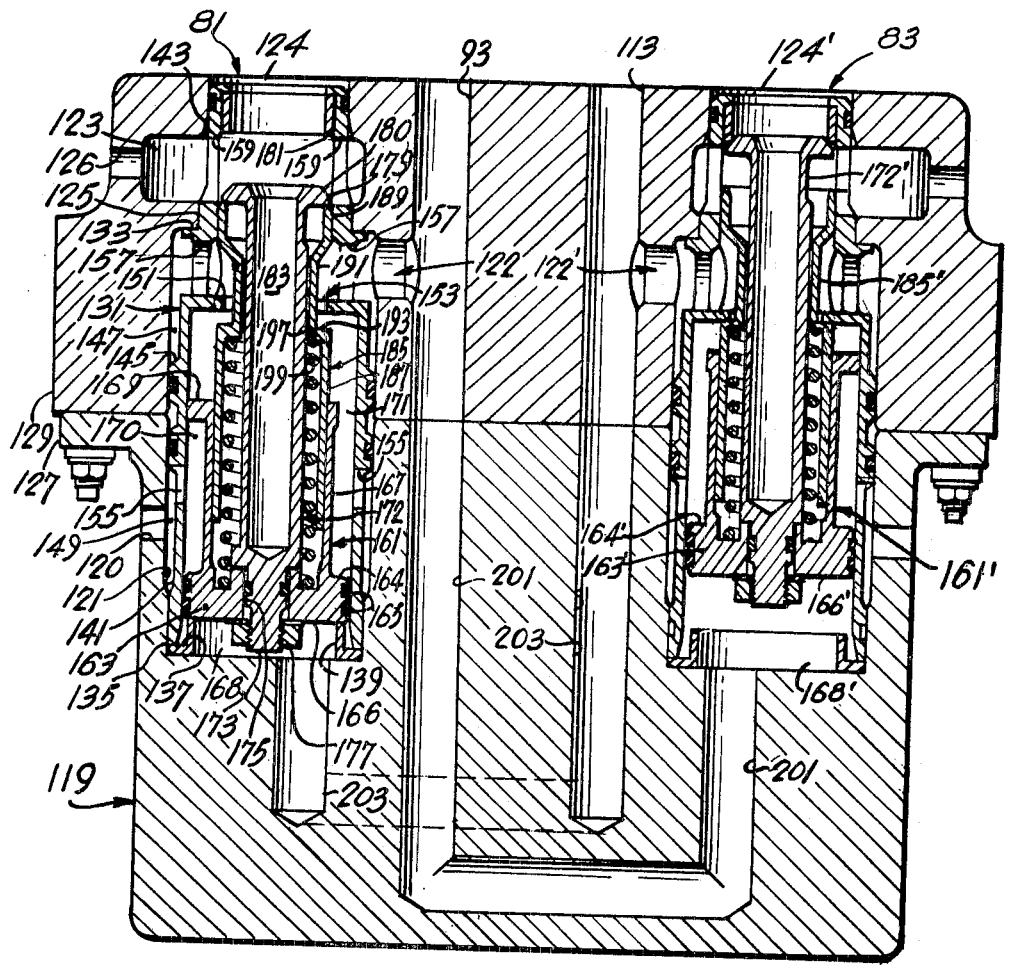
FIG. 2 is a cross-sectional view showing detail of a portion of the control unit of the lubrication means.

As shown in FIG. 2 illustrating a portion of the control unit, each control valve 81, 83 is housed in a common housing 119. Since each control valve is identical, only one will be described in detail. FIG. 2 shows control valve 81 in open position and valve 83 in closed position. For control valve 81, the housing is formed with an inlet chamber 121 and an outlet chamber 123 separated from the inlet chamber by a flange 125 of the housing 119. The inlet chamber has an inlet port 120 and outlet port 122. The output chamber also has an inlet port 124 and an outlet port 126. The housing 119 may be split into two pieces 127 and 129, joined together in order to facilitate assembly.

A sleeve 131 extends longitudinally through both the inlet and outlet chambers. The sleeve has a shoulder 133 abutting flange 125 of the housing. The lower edge 135 of the sleeve rests on a flange 137 of a cylindrical spacer 139 located in the bottom of chamber 121. The spacer 139 and the flange 125 of the housing maintain the sleeve 131 in fixed position within the chambers. The sleeve 131 has a first tubular section 141 of smaller diameter than the diameter of the inlet chamber 121 and a second tubular section 143, smaller in diameter than the first section 141 and extending from shoulder 133 through the inlet chamber 123 into the inlet port 124. The second tubular section 143 cooperates in substantial sealing realtion with flange 125 that separates the inlet and outlet chambers between the pressure and scavenge sides. A collar 145 is formed about the first tubular section 141 midway between its ends. The collar 145 seals against the walls of the inlet chamber and forms, between the walls of the first section 141 and the walls of the inlet chamber, upper and lower fluid chambers 147, 149. The collar prevents oil flow directly from the inlet port 120 to the outlet port 122. The sleeve at its upper end is formed with an interior annular shoulder 151 defining an opening 153. First ports 155 are provided in the lower wall of first section 141 below collar 145, providing fluid communication to the interior of the sleeve. Second ports 157 are provided in the upper wall of the lower section 141 above collar 145 and above shoulder 151 providing fluid communication from the interior of the sleeve to the outlet port 122. Third ports 159 are provided in the walls of the upper tubular section 143 providing fluid communication between the interior of the sleeve and outlet chamber 123.

Located within the lower tubular section 141 of the sleeve is a piston 161 slidable within the sleeve. The piston includes a cylindrical base 163 having seals 165 on its periphery to provide a fluid seal between the base of the piston and the wall of the lower section 141 of the sleeve. The base rests on the cylindrical spacer 139 when the control valve is open as shown in FIG. 2. A tubular body 167, of smaller diameter than the base, extends up from the base and terminates in an outwardly directed flange 169 which bears against the wall of the sleeve. The piston body has sufficient length so that the flange 169 is located above the ports 155 in the wall of the sleeve when the piston is in its lower position. The space between the base 163 of the piston and the bottom of the main chamber 121 forms a closure chamber 168. The piston base has a first pressure surface 164 on the side of the base the body 167 extends from of less effective area than a second pressure surface 166 on the opposite side of the base. The walls of the piston body together with the sleeve wall define a fluid space 170. The upper flange 169 has an opening 171 allowing fluid to flow out of the fluid space 170.

A scavenger valve 172 concentric with the tubular piston is connected to the piston by a reduced end portion 173 passing through a hole 175 in the base 163. The scavenger is fixed in place by a nut 177 threaded on the end portion passed through the hole. The scavenger valve extends up through and from the piston and terminates with an outwardly flared edge 179 within the upper tubular section 143 of the sleeve. The edge 179 is located adjacent the bottom of the ports 159 when the piston is in its lower position. The edge has a seating surface 180. A seating ring 181 is fixed within the end of the section 143 of the sleeve located in the inlet port 124. Movement of the piston 161 upwardly within the sleeve will move the scavenger valve 172 causing its seating surface 180 to seat against ring 181 thus closing the inlet port 124. If desired, a blind hole 183 can be formed in the valve element.

Extending concentrically about the scavenger valve 172 is a pressure valve 185 with a lower cylindrical section 187 riding within and against the inner surface of the wall of the piston 161 and located within the first section 141 of the sleeve 131. An upper cylindrical section 189 of the pressure valve is shaped to slidably move within and against the inner surface of the second section 143 of sleeve 131. The diameter of the upper section 189 is sized in relation to inner diameter of second section 143 so that pressure oil is allowed to leak under control by the upper section 189 of pressure valve 185 into the scavenge chamber 123. An intermediate cylindrical section 191 of lesser diameter than the other sections passes through opening 153 in the sleeve and connects the upper and lower sections 189 and 187. At the connection between the intermediate section 191 and the lower section 187 of the pressure valve, a seating shoulder 193 is formed which cooperates with flange 151 formed on the sleeve 131 to prevent fluid flowing from fluid space 170 through openings 157 in the sleeve to outlet port 122. A shoulder 197 is formed on the inner surface of the pressure valve adjacent the juncture of the intermediate section 191 and lower section 187. The shoulder 197 receives one end of a spring 199, the other end of which bears against the base 163 of the piston 161. The spring is located concentrically between scavenger valve 172 and the lower section 187 of the pressure valve and the piston. The spring 199 tends to bias the pressure valve 185 upwardly away from the piston. When the control valve is open, the flared edge 179 of the scavenger valve maintains the pressure valve open against the force of the spring by serving as an abutment for the end of the upper section 189 of the pressure valve. This prevents upward movement of the pressure valve by spring 199 and seating of flange 193 against flange 151.

The outlet port 122 of control valve 81 connects to conduit 93 to feed output section 11. A branch conduit 201 leads from conduit 93 to the bottom of the closure chamber 168′ in control valve 83. Similarly, outlet port 122′ of control valve 93 connects to output section 11 through conduit 113. A branch conduit 203 from conduit 113 is connected to the closure chamber 168 in control valve 81. Oil returns from output section 11 through conduit 99 to inlet port 124 in control valve 81 or through conduit 114 to inlet port 124′ in control valve 83.

The control unit 13 operates to control flow from either lubrication means to the output section as follows. Assume the lubrication system for the first engine is the first to attain an operating pressure. Oil flows through conduit 87, inlet port 120, through lower chamber 149 and ports 155 into fluid space 170. The oil at the operating pressure acting on the first pressure surface 164, causes the piston 161 and scavenger valve 172 to move down thus opening the scavenger valve and connecting return inlet port 124 to return outlet port 126. The piston moves down because the surface area 164 of the base 163 of the piston is greater than that of the flange 169 of the piston which has the opening 171. Downward movement of the scavenger valve 172 causes its flared edge 179 to bear on the edge of the upper section 189 of pressure valve 185 moving it down against the force of spring 197. This downward movement breaks the seal between flange 151 and seating shoulder 193 allowing oil to flow from the fluid space 170 through opening 153, openings 157 and outlet port 122 to lubricate the output section 11 through conduit 93. Simultaneously, the oil under operating pressure through conduit 201 flows into chamber 168′ in control valve 83 and, acting on pressure surface 166′, moves piston 161′ upwardly to close both the scavenger and pressure valves 172′ and 185′. The area of the base of the piston is large enough to provide the necessary force to maintain control valve 83 closed even though the second lubrication system connected with it eventually builds up to the same operating pressure as the first lubrication system. With control valve 81 opened and control valve 83 closed, oil returns from the output section 11 through conduit 99, port 124, chamber 123, outlet port 126 and conduit 101 to the input section 7 of the first engine.

If the second lubricating system is the first to attain the operating pressure, control valve 83 operates in the same manner as control valve 81 to open and allow fluid to flow from the second lubricating system to the output section 11 and in opening the scavenger valve 172′, allows the fluid to return therefrom through the scavenger valve to the input section 9 of the second engine. Simultaneously, pressure is applied through line 203 to the base 163 of the piston 161 in the first control valve 81. This pressure forces the piston 161 upwardly within the sleeve 131 thereby closing the scavenger valve 172 against the seat 181 to prevent the return of oil from the output section 11 through port 124 and thus preventing the oil from the second lubricating system from entering the first lubricating system. Upward movement of the piston 161 also closes the pressure valve 185 through the force of the spring 199. The spring causes the pressure valve 185 to move upwardly and seal against the flange 151 with its shoulder 193 preventing oil flow from the first lubricating system through the port 122 and the conduit 93 to the output section. This effectively seals off the first lubricating system from the output section.

If either of the lubrication systems connected by the control unit 13 to output section 11 loses its pressure for any reason, the control valve of the other system, which is also operating at the required pressure, will open and allow the other system to lubricate the output section of the reduction gearbox to ensure continued operation of at least part of the engine system.

For example, if the first lubricating system is connected to the output section 11 through control valve 81 and a loss of pressure in the system occurs, the pressure through conduit 201 keeping control valve 83 closed is lessened. Eventually, the pressure exerted by the second lubrication system on the surface 164′ of piston 161′ in control valve 83 is sufficient to overcome the force exerted on its base surface 166′ through conduit 201 and control valve 83 opens to connect the second lubrication system to the output section. Simultaneously, the first control valve 81 and port 124 is closed through the pressure in conduit 203 thus preventing flow from the output section into the first lubrication system.

If failure occurs in the output section 11 of the reduction gearbox so that there is a loss of oil, the oil loss from whichever system is connected to lubricate it will cause a pressure drop in that system, thus eventually cutting in the other lubrication system to continue providing oil to the output section until the oil from both systems is gone. This allows the entire engine system to operate for a longer period of time until complete engine failure occurs.

It will be seen that no further gear pumps are required to provide lubrication to the output section of the reduction gearbox over and above those normally used in lubricating the first and second engines.

I claim:
1. Lubrication means for an engine system having two engines coupled together by a reduction gearbox to a single output, the reduction gearbox having one output gear compartment and two input gear compartments, one for each engine, the lubrication means comprising two separate lubrication systems, means connecting each system to lubricate one engine and the input gear compartment for that engine, each system also being connected to a control unit, the control unit connecting the first system to attain operating pressure to the output gear compartment to lubricate it and preventing connection of the second system to the output gear compartment.

2. Lubrication means as claimed in claim 1 wherein the control unit includes two control valves, each control valve connecting one lubricating system to the output compartment of the reduction gearbox, means interconnecting the control valves to each other so that the control valve for the first system to attain an operating pressure opens to simultaneously allow lubrication to flow to the output compartment of the reduction gearbox and closes the control valve in the second lubrication system to prevent the flow of lubrication from the second system to the output compartment.

3. Lubrication means as claimed in claim 2 wherein each control valve includes a scavenger valve controlling the return of lubrication from the output compartment through the control unit and into the corresponding input section of the corresponding lubrication system.

4. Lubrication means as claimed in claim 2 wherein each control valve includes a scavenger valve and pressure valve, the scavenger valve movable between open and closed positions to control return oil flow from the output compartment to the lubrication system associated with it, the pressure valve movable between open and closed positions to control oil flow from the lubrication system associated with it to the output compartment and means for moving the scavenger valve and the pressure valve to open and close both substantially simultaneously.

5. Lubrication means as claimed in claim 4 wherein the means for moving the scavenger valve comprises a piston and the interconnecting means comprises a passageway from the outlet of the pressure valve of each control valve to the piston in the other control valve.

6. Lubrication means as claimed in claim 5 comprising means on said scavenger valve for opening the pressure valve as said scavenger valve is opened by the piston and means operably connecting the pressure valve and piston to close the pressure valve as the piston moves to close the scavenger valve.

7. Control unit means for connecting one of two lubricating systems, to the exclusion of the other, to a device to be lubricated comprising a housing, two control valves in said housing, one for each system, each control valve including an inlet chamber and an outlet chamber, means connecting the associated lubricating system to said inlet chamber, means connecting said inlet chamber to said device, first return means connecting said device to said outlet chamber, second return means connecting said outlet chamber to said lubrication system, a piston movable in said inlet chamber, a scavenger valve connected to said piston, and movable in said outlet chamber to open or close said first return means, a pressure valve concentric about said scavenger valve and movable to control fluid flow through the inlet chamber from said associated lubrication system to said device, and a passageway extending from said means connecting the inlet chamber of each control valve to said device to the inlet chamber in the other control valve to apply fluid pressure to move the piston to close the scavenger and pressure valves of said other control valve.

8. A control unit as claimed in claim 7 wherein said scavenger valve includes means for opening said pressure valve to allow fluid flow through said inlet chamber as said scavenger valve is moved by said piston to open said first return means.

9. A control unit as claimed in claim 8 wherein said pressure valve is spring biased away from said piston in a direction tending to close it and said means on said scavenger valve prevents closure of said pressure valve when said scavenger valve is in an open position.

10. A control unit as claimed in claim 7 wherein each piston has two opposed pressure surfaces, unequal in area, said smaller pressure surface in communication with the associated lubrication system through said inlet chamber, said larger pressure surface in communication with the other lubrication system through the connecting passageway extending from the other control valve.

11. A control unit as claimed in claim 10 including means for spacing each piston from the bottom of the inlet chamber when the control valve is open to form a closure chamber, said connecting passageways communicating with said closure chambers.

References Cited

UNITED STATES PATENTS

| 1,166,421 | 1/1916 | Armstrong | 184—6 |
| 1,710,962 | 4/1929 | Banner | 60—97 |
| 2,543,200 | 2/1951 | Rich et al. | 60—97 |
| 2,958,338 | 11/1960 | Bachmann | 60—97 XR |

MANUEL A. ANTONAKAS, Primary Examiner

U.S. Cl. X.R.

60—97